United States Patent [19]

Schuhmacher et al.

[11] 4,111,913

[45] Sep. 5, 1978

[54] POLYURETHANE ELASTIC MOLDING MATERIAL

[75] Inventors: Gunter Schuhmacher, Weinheim an der Bergstr.; Horst Muhlfeld, Wahlen, both of Fed. Rep. of Germany

[73] Assignee: Firma Carl Freudenberg, Weinheim, Bergstrasse, Fed. Rep. of Germany

[21] Appl. No.: 590,649

[22] Filed: Jun. 26, 1975

[30] Foreign Application Priority Data

Jul. 4, 1974 [DE] Fed. Rep. of Germany ....... 2432090

[51] Int. Cl.$^2$ .............................................. C08G 18/28
[52] U.S. Cl. .................................... 528/273; 528/85; 260/860
[58] Field of Search .................................... 260/75 NP

[56] References Cited

U.S. PATENT DOCUMENTS

| | | | |
|---|---|---|---|
| 2,741,800 | 4/1956 | Brockway | 260/75 NP X |
| 3,357,954 | 12/1967 | Kirkaldy | 260/75 NP |
| 3,931,113 | 1/1976 | Seeger et al. | 260/75 NP X |
| 3,957,753 | 5/1976 | Hostettler et al. | 260/75 NP X |

FOREIGN PATENT DOCUMENTS 6,708,263  6/1967  Netherlands ........................ 260/75 NP

*Primary Examiner*—Sandra M. Person
*Attorney, Agent, or Firm*—Burgess, Dinklage & Sprung

[57] ABSTRACT

Elastic, temporarily adhesive polyurethanes are produced by reaction of a polyol having a molecular weight in excess of about 500, a diisocyanate and a chain lengthener, the diisocyanate being present in about 0.4 to 1.4 times the weight of the polyol and in about 3.5 to 12.5 times the molar amount of the polyol, the chain lengthener having active hydrogen atoms and being present in about 3 to 12 times the molar amount of the polyol, the chain lengthener having a molecular weight of less than about 300, more than about 50 mole % of each of the polyol and diisocyanate units and up to about 50 mole % of the chain lengthener units comprising linear aliphatic $C_6$ units.

11 Claims, No Drawings

POLYURETHANE ELASTIC MOLDING MATERIAL

The invention relates to a polyurethane-based elastic molding material formed from polyols such as polyethers and/or polyesters with a molecular weight over 500, diisocyanates and chain lengtheners as fundamental units.

There are known numerous polyurethanes of the general composition indicated above. The properties of these polyurethane materials depend upon the selection of the fundamental units. It is possible to produce polyurethanes which have a highly crystalline structure. Such molding materials are hard and only slightly elastic. The products are mostly so readily crystallizable that they harden immediately after processing and are not adherent.

Polyurethanes of this group are in their characteristics comparable to polyamides such as for example polycaprolactam or polyhexamethylene adipamide. They consist of diols of low molecular weight, for instance 1,4-butanediol or 1,6-hexanediol, and low molecular weight diisocyanates such as 1,6-hexamethylenediisocyanate.

Polyurethane-based molding materials can usually be processed according to known methods for processing thermoplastics, for example, by injection molding or extrusion. By these procedures the very readily crystallizable, hard polyurethanes often show difficulties. While they can be rolled or piled up immediately after processing without adhering, the rapid hardening due to their readiness to crystallize is often a disadvantage. When processing into laminated sheets, this minimal tendency to adhere to the other laminate layers is also troublesome.

There are also known polyurethane molding materials with more or less large elastic constituents which, at temperatures up to about 120° C, show properties like those of other known elastomers and which can be processed equally well. As fundamental units these polyurethanes are made up of low molecular weight diisocyanates, diols and/or diamines, and also constituents of increasingly higher molecular weight, such as polyether or polyester diols; they show little tendency to crystallize and in processing show such a high degree of adhesiveness that processing into fibers, sheets, tubular films or laminated sheets is as impractical as with the highly crystalline products, although for an opposite reason.

Because of these difficulties due to the special properties and the special modes of behavior with respect to the known polyurethane molding materials, it is an object of the invention to provide novel polyurethanes particularly suitable for the production of blown sheets and particularly multilayer blown sheets.

An elastic polyurethane molding material has now been found which is composed of the known fundamental units, viz. polyols, for example polyethers and/or polyesters with molecular weights over 500, diisocyanates and chain lengtheners. The molding material does not have the known processing difficulties and, surprisingly, can be worked into blown and laminated sheets. There is a rate of crystallization that is adequate to harden the products fast enough. At the same time there is enough temporary adhesiveness so that products can be rolled up and stored without subsequent adhesion. The molding material and products made therefrom are very elastic and, at the same time, hard.

The elastic molding material according to the invention comprises a polyol having a molecular weight in excess of about 500, a diisocyanate and a chain lengthener, the diisocyanate being present in about 0.4 to 1.4 times the weight of the polyol and in about 3.5 to 12.5 times the molar amount of the polyol, the chain lengthener having active hydrogen atoms and being present in about 3 to 12 times the molar amount of the polyol, the chain lengthener having a molecular weight of less than about 300, more than about 50 mole % of each of the polyol and diisocyanate units and less than about 50 mole % of the chain lengthener units comprising linear aliphatic $C_6$ units. Preferably the diisocyanate is present in about 0.7 to 1.1 times the weight of the polyol and in about 6 to 9 times the molar amount of the polyol, and the chain lengthener is present in about 5.5 to 8.5 times the molar amount of the polyol.

Accordingly the elastic molding materials differ from the known polyurethanes in that of the three fundamental units: polyols (polyesters, polyethers), diisocyanates and chain lengtheners; at least the fundamental units polyols and diisocyanates are composed of linear aliphatic $C_6$ units and the polyols contain $C_6$ units in regular sequence. It is desirable that the polyol should not contain other fundamental units, for instance $C_2$ or $C_4$ units, within the molecule, to any major extent whether in regular or irregular sequence. It may also be useful if the chain lengthener contains linear aliphatic $C_6$ units in the described manner, in which case the portion of $C_6$ units should only amount to up to about 50 mole %.

Molding materials of this composition can undergo thermoplastic processing, are elastic and yet so readily crystallizable that within a few seconds after leaving a die casting machine or the outlet nozzle of an extruder, they lose their initial surface adhesiveness.

Thus, for example, polyesters consisting of adipic acid and ethylene glycol, or adipic acid and a glycol mixture, are less suitable for the molding materials according to the invention, because their surfaces are not dry within the short time desired after thermoplastic processing. By contrast, if a polyester obtained from ε-caprolactone is used, the advantages of the invention regarding the regular sequence of $C_6$ units are realized. With polycaprolactone and an aromatic diisocyanate, such as for example diphenylmethane diisocyanate as well as low molecular weight chain lengtheners, for instance 1,4-butanediol and/or neopentyl glycol and/or diethylene glycol, polyurethane molding materials are obtained which have a clearly improved but not always adequate crystallinity. By this is meant a lower degree of adhesiveness in relation to, for example, polyurethanes with a polyester consisting of adipic acid and ethylene glycol or a glycol mixture.

Polyesters of adipic acid and 1,6-hexanediol are, according to the invention, suitable starting material with a very regular structure or high degree of arrangement for building up the molding materials according to the application. Should 1,6-hexanediol be replaced by for example a 1,4-hexanediol, then this would mean that the linear structure is interrupted by a $C_4$ unit with an ethyl side-chain. This side-chain reduces the effect that has been emphasized of a rapid crystallization and which is observed for instance when using 1,6-dimethylhexanediol. There may in fact be employed polyesters of adipic acid and a mixture of 1,6-hexanediol with at least one of ethylene glycol, propanediol, butanediol or neopentyl glycol, less than about 50 mole % of the mixture comprising 1,6-hexanediol.

For example, hexamethylene diisocyanate has been successful as the diisocyanate, the molding material being so readily crystallizable that the products made therefrom are hard and no longer adhesive only a few seconds after extrusion.

The high degree of regular arrangement can be increased by also using as chain lengtheners fundamental units with $C_6$ constituents. The application of this possibility is limited, however, but only to the extent that the chain lengthener should contain not more than about 50 mole % of linear aliphatic $C_6$ units. If for example 1,6-hexanediol, i.e. exclusively a substance composed of $C_6$ units, is used as chain lengthener, a very rapidly crystallizing polyurethane is indeed obtained but, because of the very uniform molecular structure, the material is very high melting and exhibits a low viscosity at temperatures close to the melting point so as to cause processing difficulties. It is therefore necessary to build up an extremely regularly structured polyurethane with identical recurrent fundamental units by using the linear aliphatic $C_6$ units, while on the other hand, for the sake of elasticity desired, at least one polyol, for example a polyester of $\epsilon$-caprolactone, is to be built in as a so-called softening segment. The arrangement of the molecular structure will then be slightly interrupted in the predetermined manner as described. Thus polycaprolactone can be replaced in small part by a polyester not uniformly composed of $C_6$ units, or it is possible to use hexamethylene diisocyanate together with small portions of aromatic diisocyanates such as 4,4'-diphenylmethane diisocyanate.

As a useful, known chain lengthener besides 1,6-hexanediol for example 1,4-butanediol is also suitable. In fact the chain lengthener may comprise a mixture of 1,6-hexanediol with at least one of the ethylene glycol, propanediol, butanediol or neopentyl glycol, less than about 50 mole % of the mixture comprising 1,6-hexanediol.

Useful polyurethane molding materials consist of (a) a polyester of poly-$\epsilon$-caprolactone or polyhexamethylene glycol adipate (b) hexamethylene diisocyanate and (c) 1,4-butanediol or a mixture of 1,4-butanediol and 1,6-hexanediol. The polyurethane molding materials can be produced according to the known methods for making polyurethanes. The subsequent processing is possible in a manner that is also known, for example, by granulating the polyurethane obtained in sheet form, by injection molding or extrusion.

Particularly advantageous is the possibility of combining the polyurethane molding materials according to the invention with other thermoplastic materials immediately following formation without the need for using an adhesive to join the two materials. The union is remarkably strong. It is understandable that such an application assumes a certain variability of the melting points of the known thermoplastics is generally relatively narrow, so that in tandem processing the melting point of the polyurethane molding material should match that of the thermoplastic material. This is best achieved by selecting appropriate fundamental units in the synthesis of the polyurethane molding material in accordance with the teachings of the present patent application.

The invention is illustrated in the following examples along with comparative compositions falling outside the invention.

EXAMPLE 1 (COMPARATIVE)

Composition:
37.50 parts by weight polyester of adipic acid + 1,4-butane-diol, mol. wt. 2000
37.50 parts by weight 4,4'-diphenylmethane diisocyanate
6.75 parts by weight 1,4-butanediol
6.27 parts by weight diethylene glycol Method of preparation:
The preparation takes place in a one-shot process. Glycol, polyester and diisocyanate are weighed and added to a reaction vessel. The mixture is heated to 70° C while stirring. An exothermic reaction sets in and the temperature rises in about 5 minutes to 140° C. At this temperature the product is cast on a polytetrafluoroethylene sheet. After approximately 3 hours the sheet can be further processed into granulated material.

The polyurethane showed a good workability in blowing, but was still too adhesive to be rolled up immediately after extrusion. (Melting point of the polyurethane material: 180°-190° C).

EXAMPLE 2: (COMPARATIVE)

Composition:
20.00 parts by weight poly-$\epsilon$-caprolactone mol. wt. 2000
25.00 parts by weight 4,4-diphenylmethane diisocyanate
9.75 parts by weight diethylene glycol Method of preparation and workability in blowing as in Example 1; less adhesiveness of the blown sheet, i.e. higher rate of crystallization than with the polyurethane of Example 1, but generally not yet adequate at the higher operating speeds desired in production. (Melting point of the polyurethane material: 165°-170° C).

EXAMPLE 3 (COMPARATIVE)

Composition:
20.00 parts by weight poly-$\epsilon$-caprolactone mol. wt. 2000
25.00 parts by weight 4,4'-diphenylmethane diisocyanate
3.78 parts by weight 1,6-hexanediol
5.40 parts by weight 1,4-butanediol Method of preparation and workability in blowing as in Example 1, less adhesiveness of the blown sheets. (Melting point 185°-190° C). Rate of crystallization again not yet adequate.

EXAMPLE 4 (COMPARATIVE)

Composition:
30.00 parts by weight poly-$\epsilon$-caprolactone mol. wt. 2000
25.20 parts by weight 1,6-hexamethylene diisocyanate
12.42 parts by weight 1,4-butanediol Method of preparation:
The preparation takes place in a one-shot procedure. Glycol, polyester and diisocyanate are heated to 80° C in a reaction vessel while stirring. By exothermic reaction the temperature rises to 190° C in about 10 minutes. At this temperature the product is cast on a polytetrafluoroethylene sheet. After approximately 3 hours the sheet can be further processed.

In a blown film extrusion process it is possible to draw from this polyurethane tubular forms which crystallize immediately after leaving the extrusion nozzle, so that they can be rolled up immediately without adhering. In addition, after leaving the nozzle, the hot polyurethane has sufficient strength to prevent the film formed from tearing or collapsing. (Melting point about 180° C).

EXAMPLE 5 (COMPARATIVE)

Composition:

30.000 parts by weight poly-$\epsilon$-caprolactone mol. wt. 2000

25.200 parts by weight 1,6-hexamethylene diisocyanate 16,280 parts by weight 1,6-hexanediol Method of preparation as in Example 4.

Due to the narrow melting-point range and the low viscosity of the melt, no tubular film could be drawn from this polyurethane mixture. (Melting point about 160° C).

It will be appreciated that the instant specification and examples are set forth by way of illustration and not limitation, and that various modifications and changes may be made without departing from the spirit and scope of the present invention.

What is claimed is:

1. A cured polyurethane composition comprising a polyol having a molecular weight in excess of about 500, a diisocyanate and a chain lengthener, the diisocyanate being present in about 0.4 to 1.4 times the weight of the polyol and in about 3.5 to 12.5 times the molar amount of the polyol, the chain lengthener having active hydrogen atoms and being present in about 3 to 12 times the molar amount of the polyol, the chain lengthener having a molecular weight of up to about 300, more than about 50 mole % of each of the polyol and diisocyanate units and less than about 50 mole % of the chain lengthener units comprising linear aliphatic $C_6$ units.

2. A composition according to claim 1, wherein the diisocyanate is present in about 0.7 to 1.1 times the weight of the polyol and in about 6 to 9 times the molar amount of the polyol, and the chain lengthener is present in about 5.5 to 8.5 times the molar amount of the polyol.

3. A composition according to claim 1, wherein the polyol comprises poly-$\epsilon$-caprolactone.

4. A composition according to claim 1, wherein the polyol comprises a linear polyester of adipic acid and an aliphatic diol reactant of which the major molar proportion is 1,6-hexanediol.

5. A composition according to claim 1, wherein the polyol comprises a polyester of adipic acid and a mixture of 1,6-hexanediol with at least one of ethylene glycol, propanediol, butanediol or neopentyl glycol, less than about 50 mole % of the mixture comprising 1,6-hexanediol.

6. A composition according to claim 1, wherein the diisocyanate comprises 1,6-hexamethylene diisocyanate.

7. A composition according to claim 1, wherein the chain lengthener comprises a mixture of 1,6-hexanediol with at least one of ethylene glycol, propanediol, butanediol or neopentyl glycol, less than about 50 mole % of the mixture comprising 1,6-hexanediol.

8. A composition according to claim 1, wherein the polyol consists essentially of poly-$\epsilon$-caprolactone, the diisocyanate consists essentially of 1,6-hexamethylene diisocyanate, and the chain lengthener comprises a major molar amount of 1,4-butanediol.

9. A blown tubular polyurethane film produced by extruding and curing the composition of claim 1.

10. A composition according to claim 8 wherein the chain lengthener consists essentially of 1,4-butanediol.

11. A composition according to claim 1 in the form of a cast sheet.

* * * * *